Dec. 10, 1963  K. G. ADLER  3,113,655
MACHINE FOR DISPENSING FLOWABLE PERISHABLE MATERIAL
Original Filed March 10, 1954   7 Sheets-Sheet 1
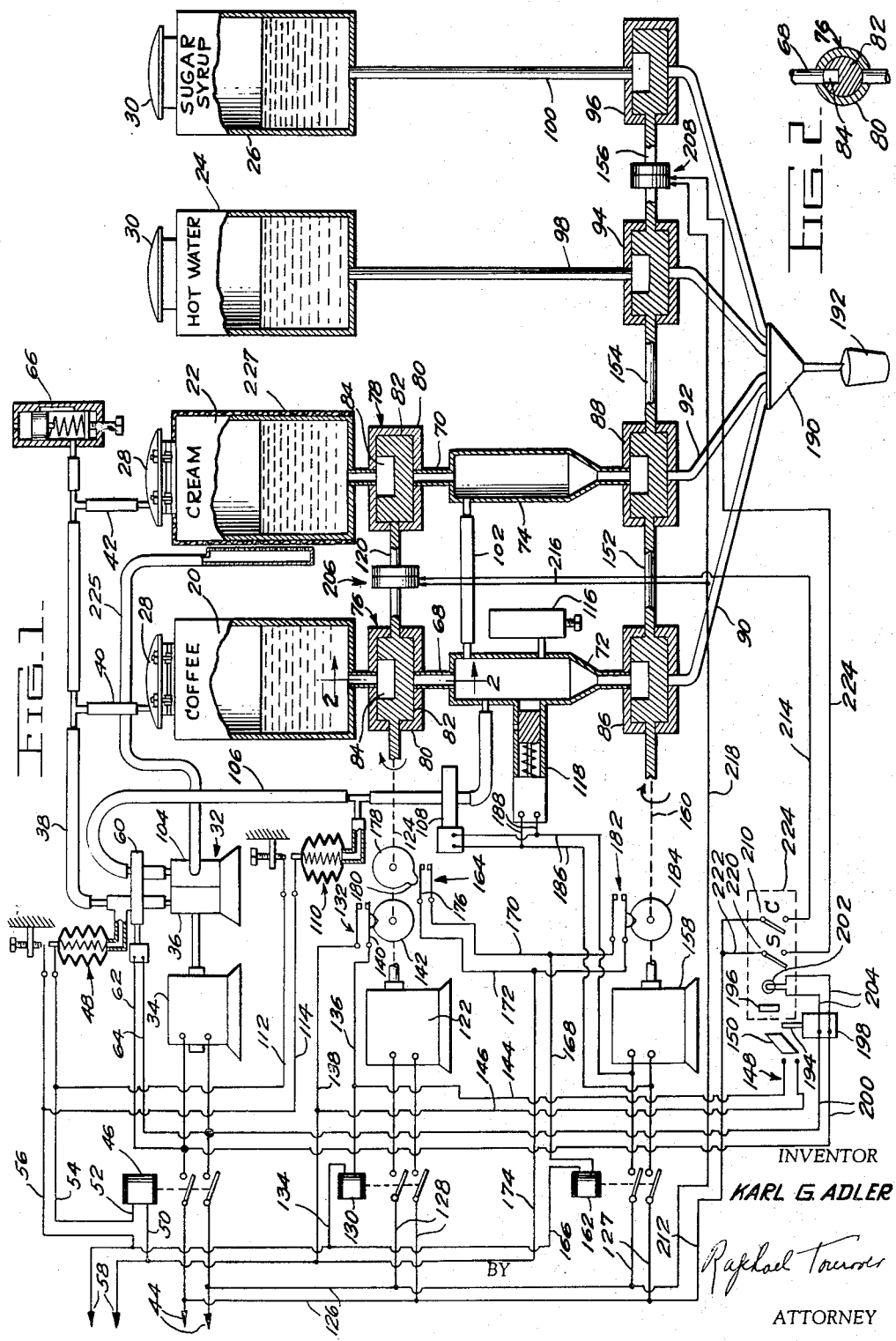
INVENTOR
KARL G. ADLER
BY
Raphael Tourover
ATTORNEY

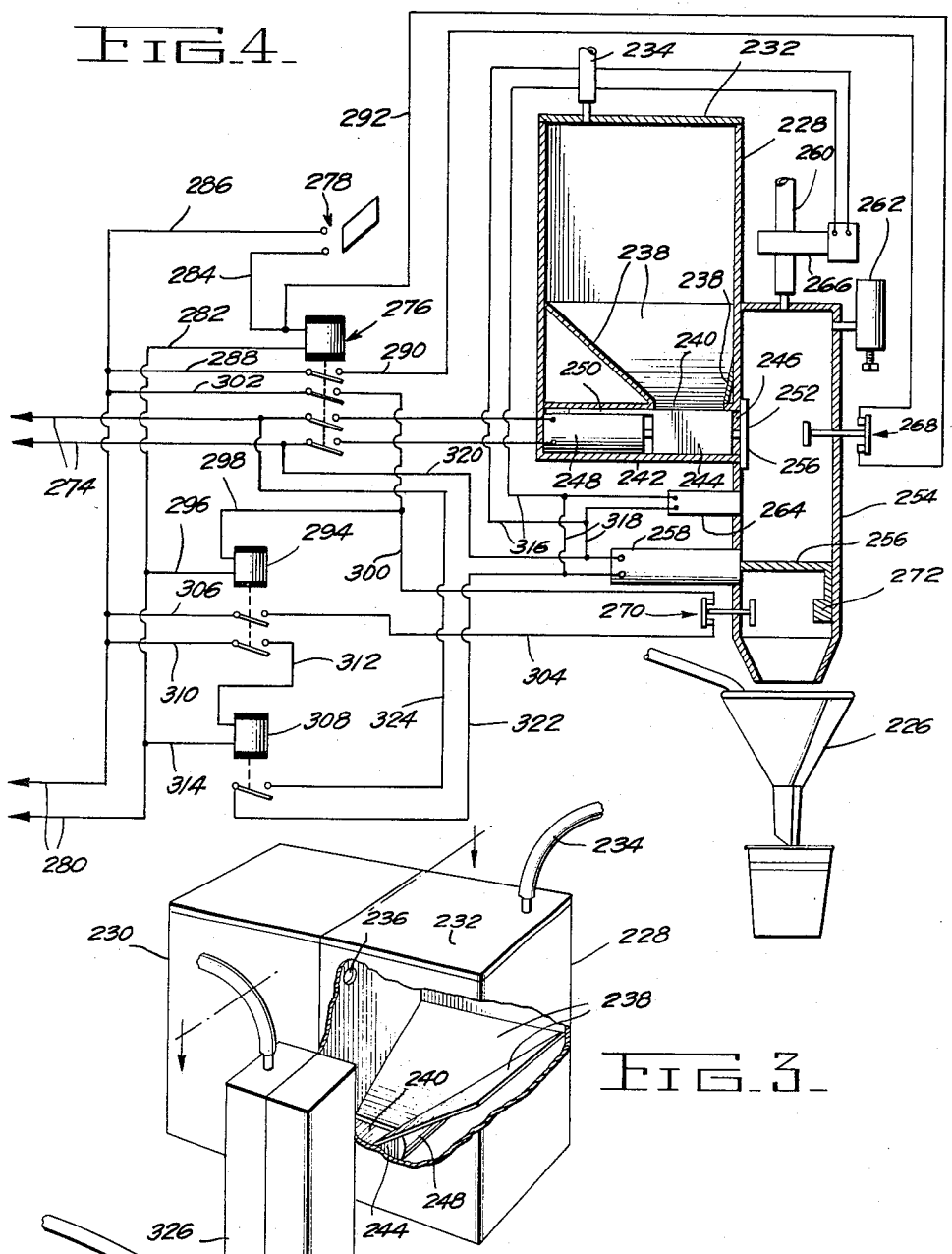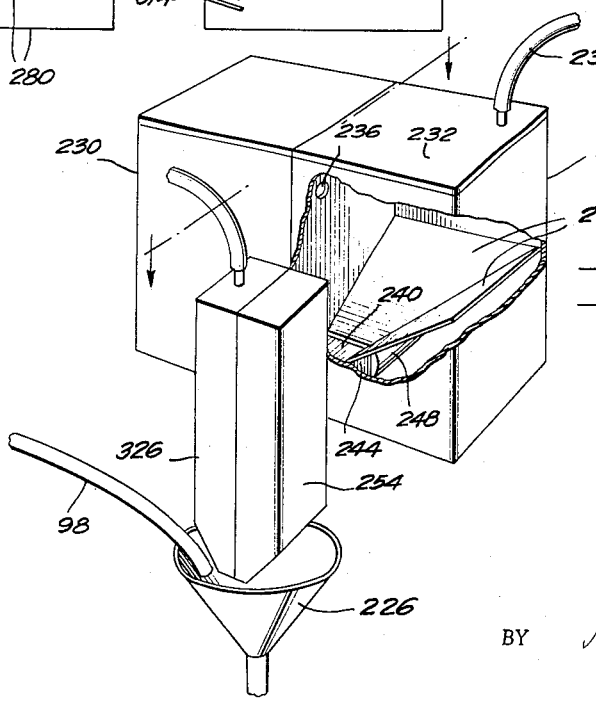

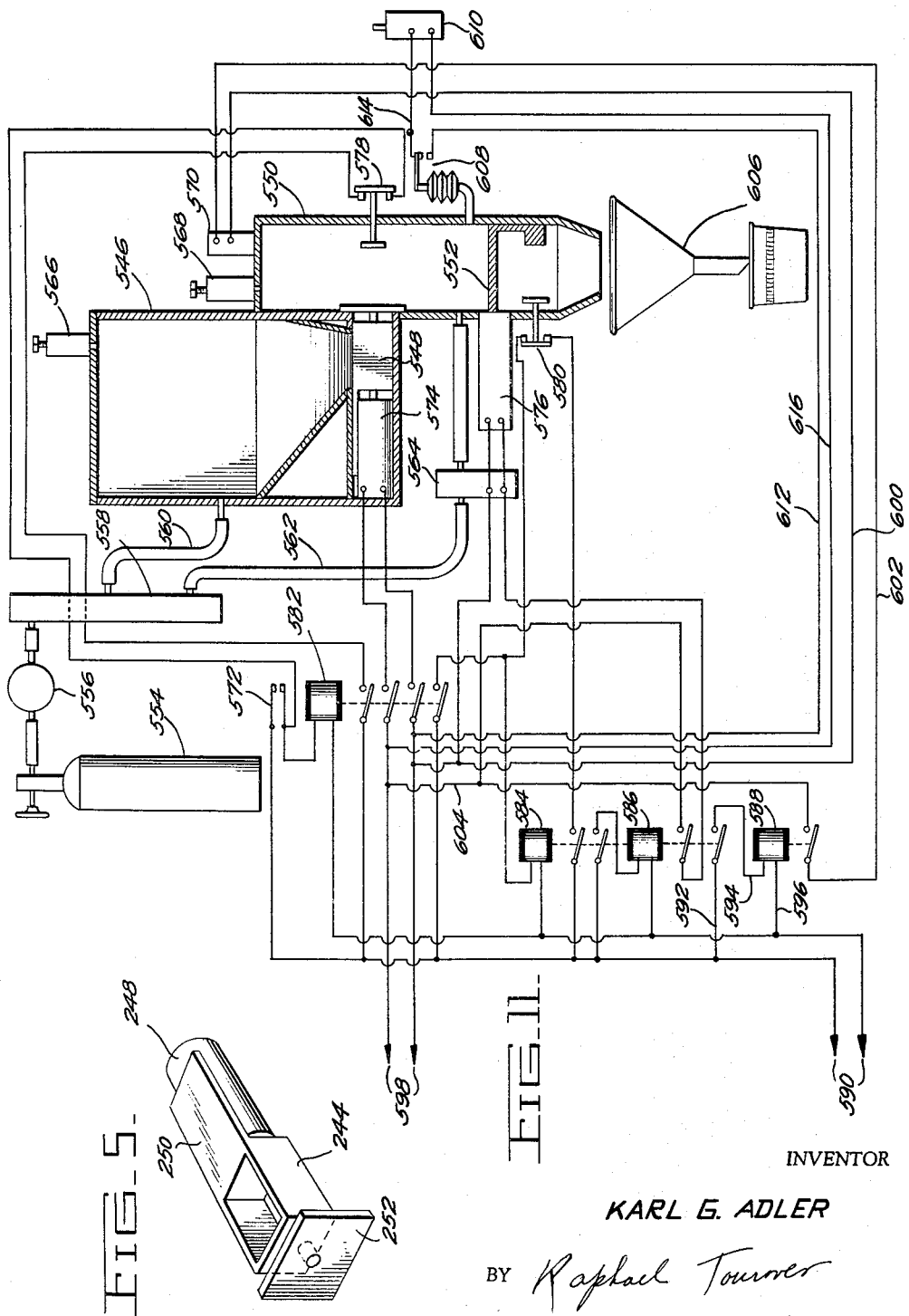

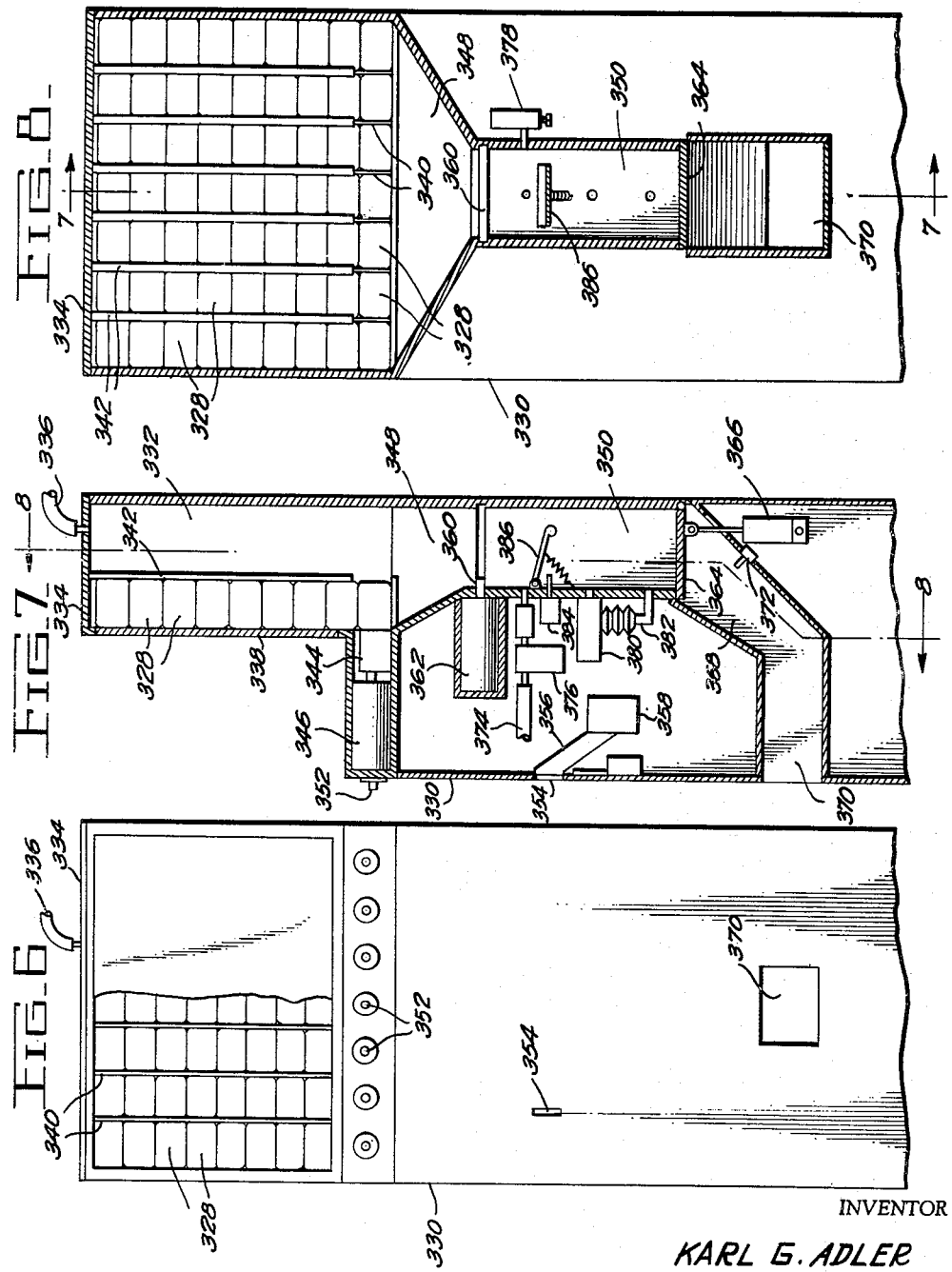

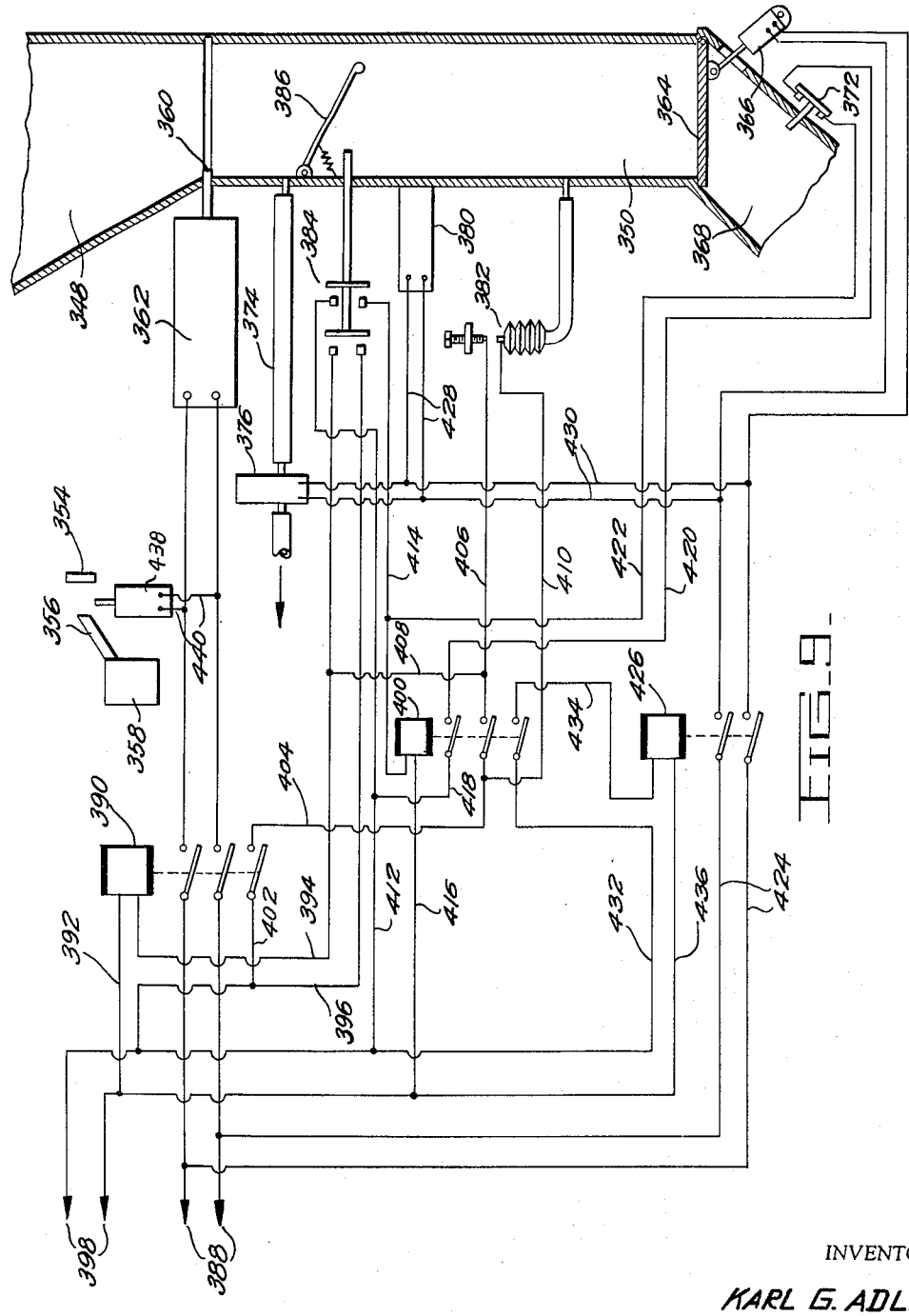

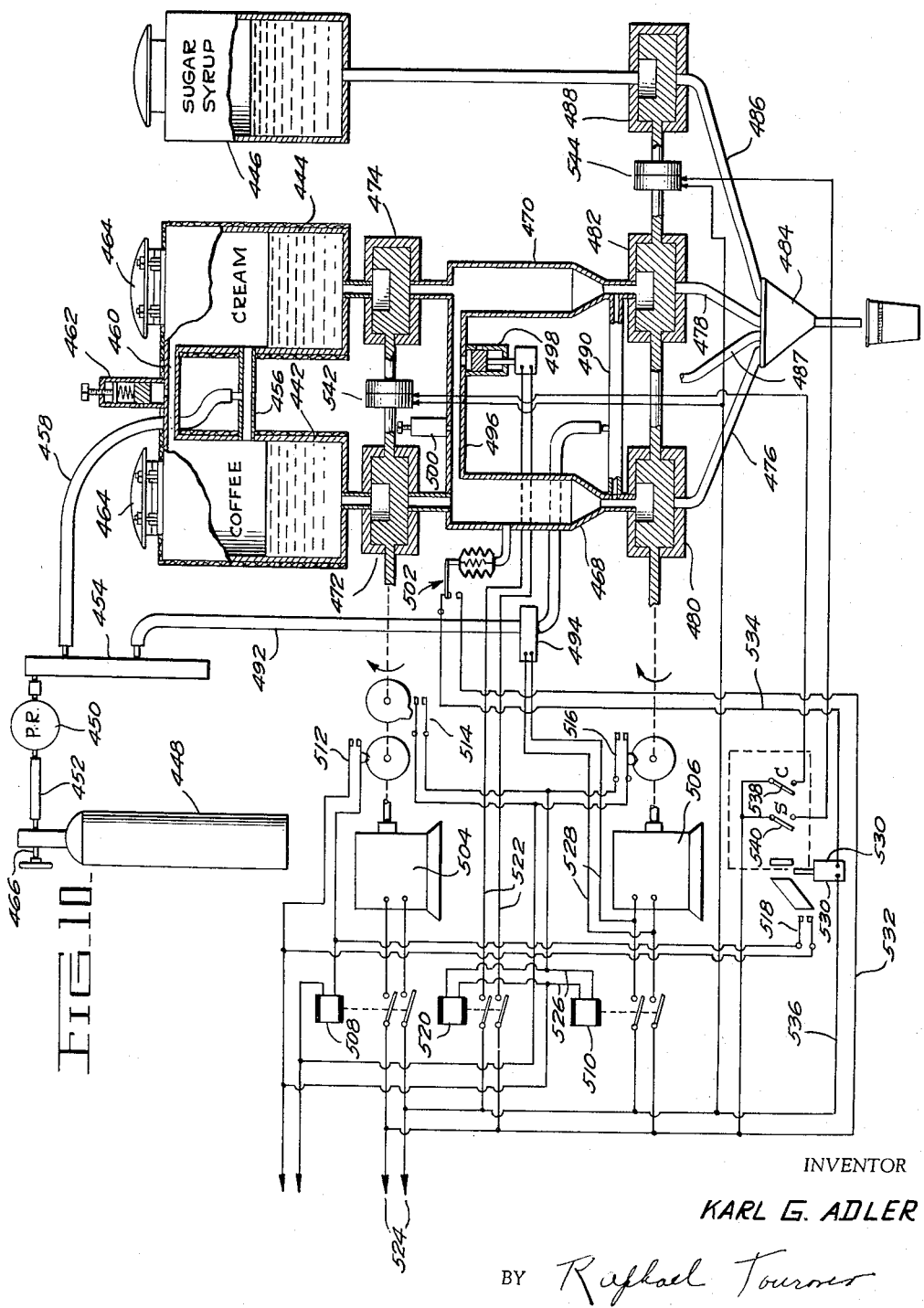

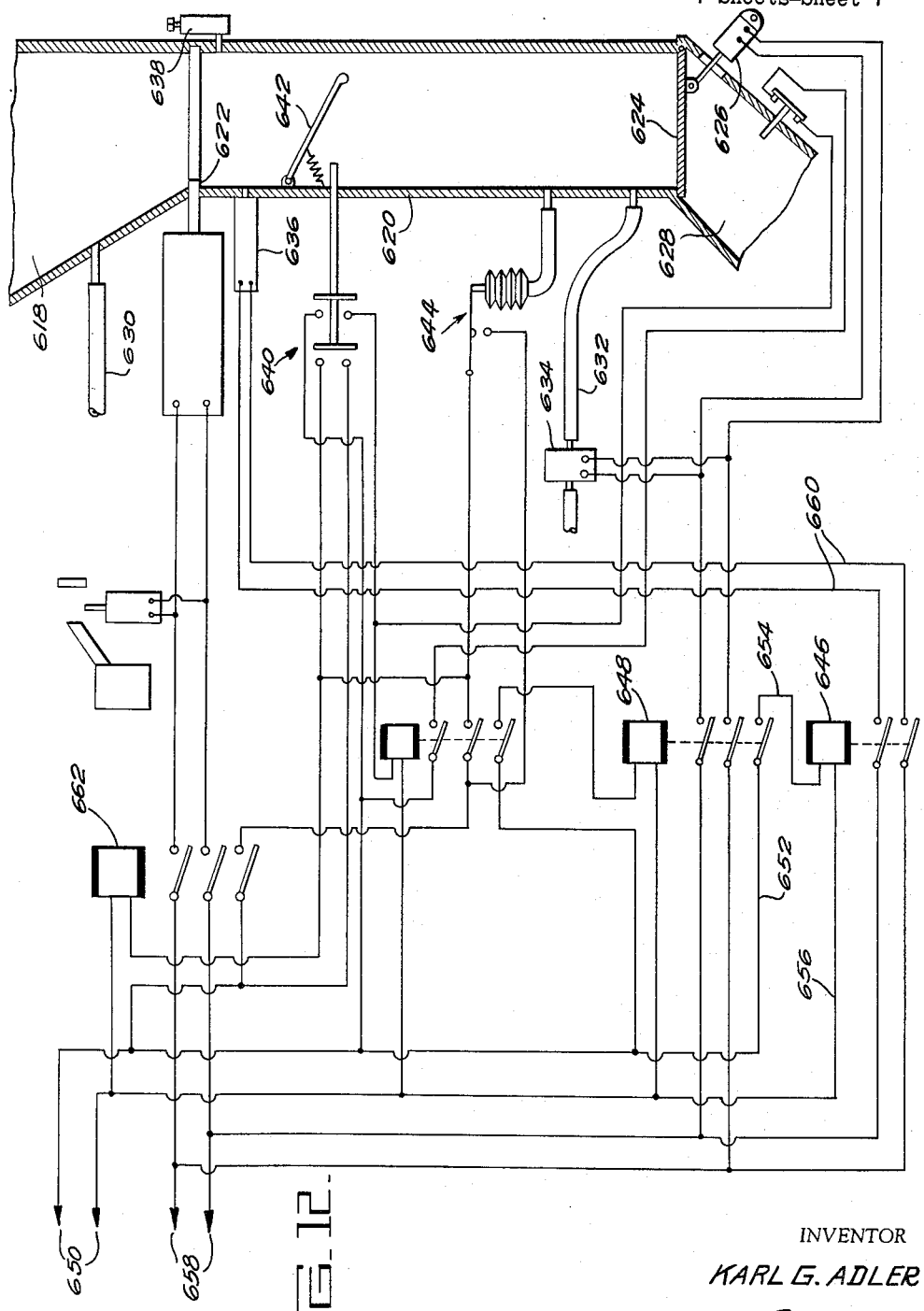

United States Patent Office 3,113,655
Patented Dec. 10, 1963

3,113,655
MACHINE FOR DISPENSING FLOWABLE
PERISHABLE MATERIAL
Karl G. Adler, 1336 Missouri Ave., Washington, D.C.
Original application Mar. 10, 1954, Ser. No. 415,345, now Patent No. 2,949,993, dated Aug. 23, 1960. Divided and this application Aug. 22, 1960, Ser. No. 51,026
21 Claims. (Cl. 194—3)

This invention relates to machines for dispensing, by the unit, materials that are subject to spoilage, deterioration and, in the case of comestibles, loss of flavor, etc. Although the invention will be described with particular reference to coin or check-operated vending machines, it will be realized that the invention is equally applicable to all types of machines for dispensing materials by the unit. This application is a division of my copending application Serial No. 415,345, filed March 10, 1954, now Patent No. 2,949,993.

Numerous liquid beverages and foods, such as coffee, milk, fruit juices, soups, etc. deteriorate relatively rapidly on exposure to atmosphere even though under refrigeration. In finely divided powdered or concentrate form, the same result obtains with the additional disadvantage that caking by moisture absorption tends to occur. Solid foods, such as sandwiches, pastries, fruits, vegetables, etc. also rapidly lose their freshness on exposure to air. Fruits, vegetables, and flowers in particular lose their aroma and spoil if stored very long exposed to air in a dispensing machine, even if refrigerated. Consequently, comestibles, flowers, etc. in general, have not been readily salable in conventional vending machines except when subject to rapid turnover, or when bottled, canned, or otherwise packaged in airtight containers.

Accordingly, it is an object of this invention to provide a machine for dispensing spoilable materials by the unit with means for inhibiting material spoilage.

It is another object of this invention to provide a machine for dispensing comestibles by the unit from a bulk supply with means for preserving the freshness, flavor, etc. of such comestibles.

It is a further object of this invention to provide a check-operated vending machine for comestibles and like materials wherein such materials will be preserved against spoilage over extended periods.

Other objects and advantages of the invention will be evident from the following description and accompanying drawings, in which FIGURE 1 is a schematic view of a vacuum-storage machine embodying this invention for vending liquids and including controls therefor;

FIGURE 2 is a fragmentary sectional view taken on line 2—2 of FIGURE 1;

FIGURE 3 is a perspective view, with parts broken away, of a portion of a vacuum-storage machine embodying this invention for dispensing finely divided materials;

FIGURE 4 is a schematic view of a machine corresponding to FIGURE 3 and including controls therefor;

FIGURE 5 is a perspective view of structural elements of the machine shown in FIGURES 3 and 4;

FIGURE 6 is a front view of a vacuum-storage machine embodying this invention for vending articles;

FIGURE 7 is a vertical sectional view of the machine shown in FIGURE 6, and taken on line 7—7 of FIGURE 8;

FIGURE 8 is a sectional view taken on line 8—8 of FIGURE 7;

FIGURE 9 is a schematic view of the machine shown in FIGURES 6 to 8 illustrating the controls therefor;

FIGURE 10 is a schematic view of a preservative gas storage dispensing machine of the type shown in FIGURE 1;

FIGURE 11 is a schematic view of a preservative gas storage dispensing machine of the type shown in FIGURE 4;

FIGURE 12 is a schematic view of a preservative gas storage dispensing machine of the type shown in FIGURE 9.

The invention in general contemplates the storage of spoilable materials in dispensing machines in storage compartments or containers therein, from which air is entirely or only partially displaced or modified by a separate gaseous medium, to thereby inhibit deterioration, loss of flavor and, in the case of finely divided powdered materials, contamination by moisture. Hence, the materials may be kept in the machine over extended periods of time. The air may be displaced by a vacuum or by partially or entirely replacing or modifying the air with a preservative gas. The nature of the gas will depend, of course, on the kind of materials being dispensed, but among gases known for their preservative properties may be mentioned, for example, carbon dioxide, ozone, sulphur dioxide, and nitrogen.

From the storage chamber a unit of the material is transferred to an interlock chamber, from which air is also partially or entirely displaced or modified by a preservative gas in the same manner as the air in the storage chamber to prevent alteration of the atmosphere in the storage chamber during such transfer. After the transfer is accomplished and the storage chamber resealed, the interlock chamber is opened to atmosphere and the unit of material discharged therefrom, whereupon the interlock chamber is resealed and the air again partially or entirely displaced therefrom or modified by gas for another dispensing cycle.

In many instances, refrigeration or cooling should also be employed to aid in the preservation of the materials. When preservation is accomplished by gas, the amount thereof should be correlated with temperature for optimum results, depending on the material being preserved.

*Dispensing of Liquids—Vacuum Storage*

The invention will be described first with reference to the dispensing of liquid materials under vacuum storage, and as exemplary thereof, there is shown in FIGURE 1 of the drawings a coin-operated machine embodying this invention for vending coffee.

The coffee is stored in the form of a liquid concentrate to which the machine adds hot water and, at the option of the purchaser, cream and/or sugar syrup.

The machine has three storage containers, one—20—for liquid coffee concentrate, a second—22—for cream, and a third—26—for sugar syrup. A tank 24 provides a source of hot water. Since coffee rapidly loses its flavor and cream spoils more rapidly on exposure to air, the containers 20 and 22 are maintained under a vacuum and, hence, are designed to withstand exterior pressures and provided with airtight, appropriately gasketed, removable covers 28. Since sugar syrup, however, will not deteriorate appreciably on exposure to atmosphere, the container 26 need not be designed for vacuumizing, although it has also a removable cover 30.

The water in the tank 24 may be maintained at near boiling temperature by appropriate thermostatically controlled fluid fuel burner means (not shown) or electric heating means (not shown). Because of the large quantity used, water preferably is constantly supplied to the tank 24 by a direct connection to a water main, and the water inlet to the container controlled by a float valve (not shown). Additionally, the preservation of the coffee and the cream may be enhanced by appropriate cooling or refrigeration means (not shown) for their respective containers, as later explained.

A vacuum is maintained in the containers 20 and 22 by a dual vacuum pump 32 driven by an electric motor 34, and having one pump part 36 thereof connected to a conduit 38 to which the containers 20 and 22 are connected by branch conduits 40 and 42. Preferably, the conduits 40 and 42 connect to the covers 28 and have appropriate filters (not shown) covering their inlets.

The motor 34 is supplied with power from an appropriate source, here shown as the conductors 44, and controlled by a relay 46 having two sets of normally open contacts. The energizing coil of the relay 46 and the normally closed contacts of a conventional adjustable pressure-responsive switch 48 are connected in series via conductors 50, 52, 54 and 56, with another appropriate source of power, here shown as the conductors 58.

The pressure responsive switch 48 is mounted on the conduit 38 and responsive to reduced pressures therein to open its contacts when a predetermined reduced pressure is attained therein. Consequently, the switch 48 automatically operates the pump 32 to maintain a predetermined degree of vacuum in the containers 20 and 22.

A normally closed dual solenoid valve 60 has one valve part thereof interposed in the conduit 38, between the pump 32 and the switch 48, and has its solenoid connected in parallel with the motor 34 by the conductors 62 and 64. Hence, the valve 60 is open when the pump 32 is operating but closes on stoppage of the latter for any reason, e.g. power failure, to prevent any reverse leakage of air through the pump that might break the vacuum in the containers 20 and 22.

Additionally, a conventional automatic vacuum breaker 66 of the regulator type is connected to the conduit 38. The vacuum breaker 66 is adjustable to admit air to the conduit 38 at a predetermined reduced pressure therein to prevent too great a vacuum in the containers 20 and 22, in the event the switch 48 fails to open its contacts at its set predetermined reduced operating pressure.

Disposed below the containers 20 and 22 and connected thereto by conduits 68 and 70, respectively, are interlock chambers 72 and 74. Interposed in the conduits 68 and 70 are metering valves 76 and 78, each having a cylindrical casing 80 enclosing a rotary plug 82.

A cavity 84 of appropriate predetermined volume in each plug 82 is filled with liquid from the respective container 20 or 22, and on a complete revolution of the plug, as later explained, the volume of liquid is discharged into the respective interlock chamber 72 or 74, and the cavity repositioned for refill.

In its cavity-filling position, each valve 76 and 78 seals off its conduit 68 or 70. Similar metering valves 86 and 88, identical to the valves 76 and 78, are connected into discharge conduits 90 and 92 leading from the bottoms of the interlock chambers 72 and 74. It is not essential that the valves 86 and 88 be of the metering type, however. It is sufficient that they open and reclose on one revolution thereof. Since they are not vacuumized, the tank 24 and container 26 have no interlock chambers associated therewith. Metering valves 94 and 96, however, identical to the valves 76 and 78, are connected into discharge lines 98 and 100, respectively, leading from the bottoms of the tank 24 and container 26.

The interlock chambers 72 and 74 are connected together by a pressure equalizing conduit 102 and to the other part 104 of the dual vacuum pump 32 by a conduit 106 connected to one of the interlock chambers, e.g. chamber 72. The other part of the dual solenoid valve 60 is connected into the conduit 106 adjacent to the pump 32. A normally open solenoid valve 108 is also connected into the conduit 106, and between the valves 108 and 60 a normally closed pressure-responsive switch 110, identical to the switch 48, is mounted on the conduit 106 to be responsive to reduced pressures therein. The normally closed contacts of the switch 110 are connected essentially in parallel with the contacts of the switch 48, by conductors 112, 54, 56 and 114.

An automatic regulatory vacuum breaker 116, which may be identical to the vacuum breaker 66, is connected to one of the interlock chambers, e.g. chamber 72, and a solenoid-operated vacuum breaker 118 is also connected to one of the chambers, e.g. chamber 72. The electrical connections to the valve 108 and the vacuum-breaker 118 are arranged in parallel, so that whenever the vacuum breaker 118 is operated to break the vacuum in the chambers, as later explained, the valve 108 is closed to shut off communication between the interlock chambers 72 and 74 and the pressure responsive switch 110.

As will be appreciated, when requirements dictate different degrees of vacuum in the containers 20 and 22, or for other reasons, the containers 20 and 22 and their interlock chambers 72 and 74 may be vacuumized by independent, separated, controlled systems similar to that shown and are not connected by pressure equalizing conduits.

The plugs of the metering valves 76 and 78 are ganged for simultaneous operation by a shaft 120 and rotated by an electric motor 122 connected to the plug 82 of the valve 76 by a shaft 124. If necessary, appropriate reduction gearing (not shown) can be connected between the motor 122 and the shaft 124. The motor 122 is supplied with power from the conductors 44, via conductors 126 and 128, the latter having the normally open contacts of a relay 130 interposed therein. The energizing coil of the relay 130 and the normally open contacts of a cam-operated switch 132 are connected in series across the conductors 58 by the conductors 134, 136 and 138. One contact of the switch 132 is mounted on a spring switch blade 140 for bias away from the other contact. A follower on the switch blade 140 rides on a circular cam 142 mounted on the shaft 124 and having a single depression in its peripheral surface. When the follower on the blade 140 drops into the cam depression, the contacts of the switch 132 are opened, but when the follower rides the circular surface of the cam 142, the contacts of the switch 132 are closed.

Connected in parallel with the switch 132, via conductors 144, 136, 138 and 146, is a coin-operated switch 148 adapted to be closed momentarily by the passage of a coin through a coin chute 150, which may include a slug rejector (not shown). A momentary closing of the coin switch 148 energizes the relay 130 to start the motor 122, which turns the cam 142 to close the cam-switch 132. Thus, the motor 122 operates to turn the shaft 124 until the cam-switch 132 is again opened by the follower on the switch blade 140 dropping into the depression in the cam 142. Hence, the shaft 124 makes one revolution when a coin is deposited in the machine, and in so doing, transfers a predetermined measure of coffee and cream from the containers 20 and 22 and into the interlock chambers 72 and 74, respectively. The plugs of the metering valves 86, 88, 94 and 96 are also ganged for simultaneous operation by the shafts 152, 154 and 156, and are rotated by an electric motor 158 connected to the plug of the valve 86 by a shaft 160. The motor 158 takes its power from the conductor 44 via the conductors 126 and 127 which have the normally-open contacts of a relay 162 connected therein. The energizing coil of the relay 162 and the normally-open contacts of a cam-operated switch 164 are connected in series across the conductors 58 via conductors 166, 168, 170, 172, and 174. The switch 164 has a spring blade 176 carrying one of its contacts and biasing the latter away from the other. The blade 176 rides on a circular cam 178 mounted on the shaft 124 and having a projection 180 on its surface. When the blade 176 is engaged by the projection 180, the switch 164 is closed. The two cams 142 and 178 are so angularly related that the switch 164 is closed momentarily just before the switch 132 is opened, i.e. just before the valves 76 and 78 complete a revolution and stop at their filling position after a transfer cycle.

A cam-operated switch 182 identical to the switch 132 is connected in parallel with the switch 164 via conductors 170 and 172, and is operated by a circular cam 184 mounted on the shaft 160 and identical to the cam 142. Hence, when the switch 164 is closed momentarily by the cam 178 the motor 158 starts, rotates the shaft 160 one revolution, and stops in the same manner as the momentary closing of the coin switch 148 operates the motor 122. One revolution of the plugs of the valves 86, 88, 94 and 96 serves to discharge the previously-transferred units of material from the interlock chambers 72 and 74 and also to discharge a predetermined quantity of hot water and sugar syrup from the containers 24 and 26. The solenoid valve 108 and the vacuum-breaker 118 are connected in parallel with the electrical connections to the motor 158 via conductors 186 and 188, so that as the motor 158 starts to operate, the conduit 106 is shut off from the interlock chambers 72 and 74, and the vacuum in these chambers is relieved. Thus, the coffee and cream flow freely into their respective discharge lines 90 and 92 which lead, together with the discharge lines 98 and 100 for hot water and sugar syrup, to a mixing bowl or funnel 190, wherein the ingredients are mixed somewhat and discharged through a spout into a cup 192. Since the quantity of water dispensed in each cycle is large relative to the quantities of the other liquids, with a consequent, possibly impractically large size for the metering valve 94, the function of this valve may be performed instead by a spring biased valve (not shown), operated by a timing cam driven by the motor 158, or by other equivalent dispensing means known in the art.

When the motor 158 stops, the vacuum-breaker 118 closes and the valve 108 opens, thus exposing the switch 110 to the atmospheric pressure then existing in the interlock chambers 72 and 74. Consequently, the switch 110 closes and starts the motor 34 to reestablish a vacuum in the interlock chambers.

In order to prevent another cycle of operation of the transfer metering valves 76 and 78 before a vacuum is reestablished in the interlock chambers 72 and 74, with the consequent undesirable possibility of transferring air back into the storage containers 20 and 22, a solenoid operated blocking plate 194 is mounted for movement to block the coin slot 196 of the machine. The solenoid 198, which operates the plate 194, is connected in parallel with the electrical connections to the vacuum pump motor 34 via conductors 200. Consequently, as long as the motor 34 is operating to establish a vacuum in the storage containers 20 and 22 or their interlock chambers, ordinarily a matter of only a few seconds, the plate 194 blocks the slot 196 to prevent the insertion of a coin into the machine. If desired, a lamp 202 can be connected in parallel with the solenoid 198, via conductors 204, for lighting an advisory sign (not shown) to advise customers that the machine will receive a coin in a few moments.

In order to permit customers to selectively obtain cream or sugar with the coffee, electromagnetic clutches 206 and 208 are interposed in the shafts 120 and 156, respectively. When the clutches 206 and 208 are energized, the valves 78 and 96 are operated by their respective motors 122 and 158. The energizing coils of the clutch 206 and a customer-operated selector switch 210 are connected in series across the conductors 126, and thus, across the conductors 44, via conductors 212, 214, 216 and 218, while the clutch 208 and a similar selector switch 220 likewise are connected in series across the conductors 126, via conductors 212, 222, 224 and 218. Thus, by closing either or both the selector switches 210 and 220, a customer can have cream and/or sugar in his coffee. Desirable mechanism (not shown) known in the art is connected to the blades of the switches 220 and 222 and operated by the motor 158, or its electrical circuits, to reopen these switches after a vending cycle of the machine. Preferably, the coin slot 196, the lamp 202, and the selector switches 210 and 220 are mounted on a front panel of the machine, as indicated by the dotted lines 224.

As previously stated, refrigeration or cooling of any of the storage containers may, and probably will, be employed to aid in the preservation of the materials therein. For example, the outlet of the vacuum pump 104 may be connected to a conduit 225 to blow air over a moistened fabric jacket 227 on the cream container 22, to thus cool the latter whenever the pump 104 runs.

*Dispensing of Powdered Materials—Vacuum Storage*

As previously stated, the invention is equally applicable to the dispensing of powdered or other free-flowing granular or finely divided materials and, as exemplary thereof, there is shown in FIGURES 3 to 5 a mechanism which may be part of a coin-operated vending machine for dispensing measured units of powdered coffee concentrate and powdered cream into a mixing funnel 226, into which a proper quantity of hot water with or without sugar from a similar powder dispensing mechanism (not shown), is also dispensed through a conduit 98 by motor and valve mechanism like that shown in FIGURE 1. The mechanism for dispensing powdered materials comprises adjacent airtight storage containers 228 and 230 for powdered coffee and cream, respectively. Since these containers are identical, a description of one will suffice for both.

The coffee container 228 is substantially rectangular in plan view and has an appropriately gasketed removable cover 232, to which one end of a vacuum conduit 234 is connected with an appropriate filter (not shown) at the inlet end of the latter. The containers 228 and 230 are connected together by a pressure equalizing opening 236 adjacent their upper ends and the vacuum conduit 234 leads to an appropriate vacuum maintaining system, such as the motor 34, pump 36, valve 60, relay 46, pressure-responsive switch 48 and automatic vacuum breaker 66, shown in FIGURE 1. The container 228 has a false bottom 238, which slopes downwardly from three sides to form, in conjunction with the other side, a rectangular opening 240 spaced above the bottom 242 of the container.

An open bottom and open top four-sided receptacle 244 is slidably mounted on the bottom 242 of the container 228 in registry with the opening 240. The height of the receptacle 244 is equal to the distance between the opening 240 and the bottom 242 of the container.

The receptacle 244 is also mounted in registry with a lateral opening 246 in the side of the container 228, and is projectible therethrough by a solenoid 248 positioned beneath the false bottom 238. A slide plate 250 is secured to the upper edge of the receptacle 244 and extends rearwardly thereof over the solenoid 248 in slidable engagement with the edges of the opening 240.

Consequently, when the solenoid 248 is energized, the receptacle 244 is projected through the lateral opening 246 and carries with it a predetermined quantity of powdered coffee, which immediately falls out of the open bottom of the receptacle. The slide plate 250 closes the opening 240 during the projection of the receptacle 244 out of the lateral opening 246 to prevent material from falling behind the receptacle and impeding retraction thereof, so that when the receptacle is retracted, it fills again for another transfer cycle.

Obviously, the size of the charge may be varied by changing the size of the opening 240 and the receptacle 244. When the receptacle 244 is in its retracted position, the lateral opening 246 is sealed shut by a gasketed closure 252 secured to the forward end of the receptacle 244 and having its marginal edges engaging the exterior edge of the lateral opening 246.

A rectangular interlock chamber 254 is built onto the side of the container 228 over the lateral opening 246 therein and depends therebelow. The bottom of the interlock chamber 254 is closed by an appropriately gasketed sliding gate 256 operated by a solenoid 258. Hence, when the gate 256 is retracted, the side wall of the chamber 254 wipes powdered coffee off the gate 256 and dumps it into the funnel-like mixing bowl 226.

The interlock chamber 254 also has a vacuum line 260 connected thereto which may lead to an automatic vacuum maintaining system identical to the system constituted by the conduit 106, valve 60, pump 32, motor 34, relay 46, and pressure-responsive switch 110, shown in FIGURE 1.

The interlock chamber 254 also has an automatic vacuum breaker 262 and a solenoid-operated vacuum breaker 264 connected thereto, the same as those connected to the interlock chamber 72 shown in FIGURE 1. Additionally, the vacuum line 260 has a normally open solenoid valve 266 interposed therein which performs the same function as that performed by the valve 108 shown in FIGURE 1.

A normally closed limit switch 268 is located on the sidewall of the interlock chamber 254 opposite the closure 252 on the receptacle 244 in position to be contacted and opened by the closure 252 on projection of the receptacle from the container 228. A similar normally closed limit switch 270 is located on the side wall of the interlock chamber 254 beneath the solenoid 258 in position to be contacted and opened by a depending projection 272 on the gate 256 when the latter is retracted.

The solenoid 248 is supplied with electric power from any appropriate source, here shown as conductors 274, and connected thereto through two sets of normally open contacts of a relay 276. The energizing coil of the relay 276 and a coin-operated switch 278, which may be identical to the switch 148 shown in FIGURE 1, are connected in series across a separate appropriate source of power, here shown as conductors 280, by conductors 282, 284 and 286.

A self-energizing or holding circuit is also provided for the relay 276, which includes a third set of normally open contacts thereof connected in series with the limit switch 268, and this series connection is essentially shunted across the coin-operated switch 278 via conductors 288, 290 and 292. Consequently, when a coin is deposited and the contacts of the switch 278 close momentarily, the relay 276 is energized and held energized by its holding circuit to thus project the receptacle 244 and transfer a measured quantity of powdered coffee from the container 228 into the interlock chamber 254. The full projection of the receptacle 244, however, opens the limit switch 268 and interrupts the holding circuit so that the receptacle retracts for refilling and also reseals the lateral opening 246 in the container 228.

The energizing coil of another relay 294 and a fourth set of normally open contacts of the relay 276 are connected in series across the conductors 280, via conductors 296, 298, 300 and 302. A holding circuit is also provided for the relay 294 which includes a normally open set of contacts thereof, its coil, and the limit switch 270, connected in series with the conductors 280 via conductors 296, 298, 300, 304, and 306. Consequently, on energization of the relay 276 and reciprocation of the receptacle 244, the relay 294 is energized and held in.

Another set of normally open contacts of the relay 294 and the energizing coil of a time delay relay 308 are connected in series across the conductors 280 via conductors 310, 312 and 314. The relay 308 is of the delayed closing type, so that its single set of normally open contacts closes only after a predetermined interval after a coin is inserted in the machine, and thus energizes the time delay relay.

The vacuum breaker 264, the solenoid 258 and the solenoid valve 266 are connected in parallel via conductors 316 and 318, and this parallel connection is connected in series with the contacts of the relay 308 and with the conductors 274 by conductors 320, 322 and 324.

The delay period of the relay 308 is set to allow sufficient time for the receptacle 244 to make an excursion and reseal the lateral opening 246 in the container 228 before the vacuum is broken in the interlock chamber 254 and the material discharged therefrom by retraction of the gate 256. On complete retraction of the gate 256, the limit switch 270 is opened, thereby interrupting the holding circuit for the relay 294 to de-energize this relay and also the time delay relay 308 in preparation for another vending cycle.

The cream container 230 has an identical dispensing mechanism, including an interlock chamber 326 connected to the interlock chamber 254 by a pressure-equalizing opening (not shown). The receptacle and gate-operating solenoids of the cream dispensing mechanism may be connected in parallel with the corresponding solenoids 248 and 258 of the coffee dispensing mechanism for simultaneous operation therewith. Obviously, a cream selector switch (not shown) can be connected in series with the solenoid which operates the cream mechanism measuring receptacle. The discharge openings of the two interlock chambers 254 and 326 are closely adjacent and positioned over the mixing bowl 226.

Again, and as mentioned with respect to the previously described liquid dispensing mechanism, the containers 228 and 230 and their interlock chambers 254 and 326 may be independently vacuumized.

*Dispensing of Articles—Vacuum Storage*

The invention is also applicable to machines for dispensing preformed units of solid material, such as bread, sandwiches, fruit, pastries, etc., among which are included those wherein several different kinds (e.g. different flavors, etc.) of like articles are stored in separate stacks or vertical columns, or on several series of hinged and droppable shelves. In many of such machines now in use, the customer deposits a coin and selectively dispenses an article by operating one of a series of coin-released push-buttons or pull-levers corresponding to the different kinds of articles stored in the machine. Conventionally, the buttons or levers are equipped with slide locks so that only one button or lever can be operated at a time. The button or lever operates a mechanism which pushes out the lowermost article in the selected stack or allows the lowermost shelf to drop in the selected vertical series, thus permitting an article to fall into a chute that leads to a dispensing opening.

As exemplary of the application of this invention to such types of vending machines, there is shown in FIGURES 6 to 9 a vending machine having several stacks of generally rectangular articles 328, e.g. sandwiches. The machine has a casing 330 provided with an airtight storage chamber or compartment 332 at its top and a removable cover 334 therefor. The chamber 332 has a vacuum line 336 connected thereto and leading to a vacuum maintaining system (not shown) which may be similar to that shown in FIGURE 1.

Within the compartment 332 and along its front wall 338 is a linear row of vertical separators 340 (FIGURE 6), having lateral flanges 342 at their rear edges for retaining the merchandise in a plurality of stacks. The flanges 342 are cut away adjacent to the bottom of the separators 340 so that the lowermost article in a stack can be pushed out without releasing the articles thereabove. A corresponding number of plungers 344 are arranged in front of the lower ends of the stacks and operated by solenoids 346 to push the lowermost article out of a stack to fall into a chute 348 that has converging sides and leads to an interlock chamber 350.

A series of push-buttons 352, corresponding to the solenoids 346 and having conventional slide-locks (not shown) is arranged along the front of the machine and, at an appropriate location, there is a coin slot 354 for a coin chute 356 leading to appropriate conventional mechanism 358 for permitting the operation of a button 352 to effect the operation of the corresponding plunger 344 to eject an article from the corresponding stack into the chute 348. Since such mechanism 358 is conventional, no further description is deemed necessary here.

At the lower end of the chute 348 and separating the storage chamber 332 from the interlock chamber 350, is an appropriately gasketed, normally open sliding gate 360 similar to a gate valve and operated by a solenoid 362. The bottom of the interlock chamber 350 is formed by a normally closed, appropriately gasketed pivoted trap door 364 operated by a solenoid 366. Below the trap door 364 is an inclined chute 368 leading to a merchandise delivery opening 370 at the front of the machine. Mounted on the chute 368 in position to be engaged and opened by the trap door 364 when the latter is opened fully, is a normally closed limit switch 372.

A vacuum line 374 having a normally open solenoid valve 376 therein connects the interlock chamber 350 with a vacuum system similar to the pump 32, line 106, etc. shown in FIGURE 1. Also connected to the interlock chamber 350 is an automatic vacuum breaker 378, a solenoid-operated vacuum breaker 380, and an adjustable pressure-responsive switch 382, adapted to open at a predetermined reduced pressure in the chamber 350.

Mounted on a side wall of the chamber 350 is a "drop-through" switch 384 having two sets of normally open contacts adapted to be closed momentarily by the movement of a spring-biased plate 386 when struck by an article falling into the interlock chamber 350. The plate 386 is pivotally connected to a side wall of the interlock chamber 350 and extends at a downward inclination into proximity to an opposite wall in position to be struck and moved out of the way by a falling article of merchandise.

The gate-operating solenoid 362 is supplied with power from any appropriate source, such as the conductors 388, and is connected thereto through two sets of normally open contacts of a relay 390. The energizing coil of the relay 390 and one set of contacts of the drop-through switch 384 are connected in series, via conductors 392, 394 and 396, across a separate source of power, such as the conductors 398.

A third set of normally open contacts of the relay 390 and a normally open set of contacts of a relay 400 are connected in series across the first-mentioned contacts of the switch 384, via conductors 396, 402, 404, 406, 408 and 394 to form a holding circuit for the relay 390. This circuit also includes the pressure-responsive switch 382, which is connected in parallel with the relay contacts of relay 400 therein via conductors 406 and 410. The energizing coil of the relay 400 and the other set of contacts of the drop-through switch 384 are connected in series across the conductors 398, via conductors 412, 414 and 416.

A self-energizing holding circuit is provided for the relay 400 and includes a second set of normally open contacts thereof and the limit switch 372 connected in series across the said other set of contacts of the drop-through switch 384 via conductors 412, 418, 420, 422 and 414.

The solenoid 366 takes its power from the conductors 388, via the conductors 424 which have two sets of normally open contacts of a time delay relay 426 connected therein. The relay 426 is of the type which delays closing its contacts after energization of its coil. The solenoid valve 376 and the solenoid vacuum-breaker 380 are connected in parallel with the solenoid 366, for simultaneous operation therewith, by conductors 428 and 430. The energizing coil of the relay 426 and a third set of normally open contacts of the relay 400 are connected in series across the conductors 398, via conductors 432, 434 and 436.

In operation of the machine an article of merchandise is ejected from a selected stack, as aforedescribed, and falls into the interlock chamber 350 to land on the trap door 364. In its passage, the article actuates the drop-through switch 384 to momentarily close both sets of its contacts. Closing of these contacts energizes both relays 390 and 400, which are then maintained energized by their respective holding circuits. Consequently, the solenoid 362 is energized to close the gate 360 and seal off the storage chamber 332 from the interlock chamber 350. Energization of the relay 400 effects energization of the time delay relay 426, the delay closing period of which is set to permit the gate 360 to seal off the two chambers 332 and 350 from each other before the contacts of the relay 426 close. When the contacts of the relay 426 close, the vacuum line 374 is closed by the solenoid volve 376, the vacuum breaker 380 energized to break the vacuum in the interlock chamber 350, and the solenoid 366 energized to open the trap door 364 and drop the merchandise into the delivery chute 368.

When the trap door 364 opens fully, however, it engages and opens the limit switch 372, thus interrupting the self-energizing circuit of the relay 400 and de-energizing the same. De-energization of the relay 400 opens the energizing circuit of the relay 426 and effects de-energization of the latter. Consequently, the trap door 364 closes, the vacuum breaker 380 closes, and the solenoid valve 376 reopens the vacuum line 374. Since the interlock chamber 350 is now under atmospheric pressure, the pressure-responsive switch (not shown) in the vacuum system to which the line 374 is connected starts the system vacuum pump to re-establish a vacuum in the interlock chamber.

De-energization of the relay 400 does not interrupt the holding circuit of the relay 390, however, because the switch 382 is then closed by the atmospheric pressure then existing in the interlock chamber 350. Consequently, the relay 390 is not de-energized to open the sliding gate 360 until a vacuum is re-established in the interlock chamber 350 and opens the pressure-responsive switch 382. In this connection, a coin-blocking solenoid 438, identical to that shown in FIGURE 1, may be connected, by conductors 440, in parallel with the solenoid 362 for simultaneous operation therewith to prevent the insertion of a coin for another vending cycle until the sliding gate 360 is open.

*Dispensing of Liquids—Preservative Gas Storage*

The principles of this invention have thus far been illustrated by coin-operated vending machines wherein materials are stored under a vacuum for preservative purposes. The principles of the invention will now be illustrated by a description of coin-operated vending machines for liquid, powdered, and solid materials wherein the materials are preserved by storage in atmospheres that are modified by preservative gases, with or without the employment of cooling or refrigeration to aid in such preservation. In some instances, and depending upon the materials to be preserved, both temperature and gas concentration should be correlated for optimum preservation. Further, in some cases, a low temperature actually decreases the gas concentration required for maximum preservative benefits.

Referring now to FIGURE 10 of the drawings, there is shown therein a coin-operated vending machine for vending liquid materials, e.g. coffee, with or without cream and/or sugar (to use the same example as that shown in FIGURE 1). Only three storage containers are shown, one 442 for liquid coffee concentrate, one 444 for liquid cream, and one 446 for sugar syrup, since hot water may be supplied by the same means shown and described for the machine of FIGURE 1. Each of these containers is constructed in substantially the same manner as the storage containers shown in FIGURE 1 of the drawings, save for being designed to withstand internal pressures. Additionally, the coffee container 442 and the cream container 444 should be refrigerated to predetermined temperatures by appropriate means (not shown).

The air is entirely or only partially displaced or modified from the coffee and the cream containers 442 and 444 by a preservative gas which may be supplied from a high pressure vessel 448 to the outlet of which an adjustable pressure regulator 450 is connected by a conduit 452, the outlet of the pressure regulator being connected to a manifold 454. In this instance, it will be assumed that the preservative gas is heavier than air, so that it is desirable for such gas to be admitted to the containers 442 and 444 only slightly above the level of the liquids therein so that the gas, in passing into the containers, will displace air therefrom through an opening in the top thereof, which opening is closed when the desired proportion of preservative gas has been admitted.

Thus, for example, the two containers 442 and 444 may be connected by a pressure equalizing conduit 456 located only a slight distance above the level of the liquid in the two containers. This pressure equalizing conduit 456 receives preservative gas from the manifold 454 via a supply conduit 458. The two containers 442 and 444 are also connected together at substantially their highermost levels by another pressure equalizing conduit 460 to which a conventional, adjustable pressure relief valve 462 is attached. After the two containers 442 and 444 have been filled with their materials and their gasketed covers 464 have been bolted into place, the conventional valve 466 on the high pressure vessel 448 is opened to admit gas under a predetermined low pressure, determined by the setting of the regulator 450 and, usually not more than one or two pounds per square inch, into the manifold 454. The pressure relief valve 462 is then manually opened until gas has displaced the desired proportion of the air in the two containers 442 and 444. At this time, the relief valve 462 is adjusted to open only when the pressure in the two containers 442 and 444 slightly exceeds the set pressure of the pressure regulator 450. The pressure relief valve 462 thus serves both as an initial means for venting air from the two containers 442 and 444 and, also, as a safety device so that should the pressure regulator 450 fail for any reason, the pressure in the two containers will not become excessive. Of course, in some cases, the relief valve need not be opened on the initial gas charging when only a little gas is admitted without any air displacement. In some instances, it may be desirable to provide small electric fans (not shown) in the two containers 442 and 444 to mix the gas with the air therein and prevent stratification.

The coffee and the cream containers 442 and 444 have interlock chambers 468 and 470 connected thereto through metering valves 472 and 474, which may be identical to those shown in FIGURE 1 of the drawings. Discharge conduits 476 and 478 for the two interlock chambers 468 and 470 also have discharge valves 480 and 482 connected therein and which, likewise, may be identical to those shown in FIGURE 1 of the drawings. The discharge conduits 476 and 478 lead to a mixing bowl 484 in the same manner as heretofore described with reference to the machine shown in FIGURE 1. Similarly, a discharge conduit 486, leading to the mixing bowl 484 from the sugar container 446, has a metering valve 488 therein, and a discharge conduit 487 dispenses water to the bowl 484.

The two interlock chambers 468 and 470 are connected together at their lowermost levels by a pressure equalizing conduit 490, into which the preservative gas is supplied from the manifold 454 by a conduit 492, such conduit having a normally open solenoid valve 494 connected therein. At their upper ends, the two interlock chambers 468 and 470 are connected together by another pressure equalizing conduit 496 having a normally closed, solenoid operated vent valve 498 connected thereto.

Additionally, the pressure equalizing conduit 496 may have an adjustable pressure relief and manual vent valve 500, identical to the relief valve 462 connected thereto. The interlock chamber 468 may have also a normally closed pressure switch 502 mounted thereon and responsive to pressure therein. The switch 502 is adjusted to open its contacts when the pressure in the interlock chambers reaches the pressure in the manifold 454, i.e. the set pressure of the regulator 450.

Of course, where appropriate, the storage chambers 442 and 444 and their interlock chambers 468 and 470 can be supplied independently with different gases at different pressures and/or concentrations, instead of being interconnected for supply from a single source.

The plugs of the metering valves 472 and 474, and 480, 482 and 488 are ganged together in the same manner as those illustrated in FIGURE 1 of the drawings, and are rotated through a dispensing cycle by electric motors 504 and 506, which are controlled by relays 508 and 510 that are, in turn, controlled by cam operated switches 512, 514 and 516 in exactly the same manner as shown in FIGURE 1 of the drawings. Initiation of the vending cycle is also begun through the instrumentality of a coin switch 518 in the same manner as in the machine shown in FIGURE 1. A time delay relay 520 is added, however, and has normally open contacts which are connected in series with the conductors 522, which supply power to the solenoid operated vent valve 498 from conductors 524. The energizing coil of the time delay relay 520 is connected in parallel with the energizing coil of the relay 510 via conductors 526 so that the time delay relay will be energized simultaneously with the relay 510. The relay 520 is of the delayed opening type which delays opening its contacts for a predetermined interval after de-energization of its coil. The solenoid operated valve 494 is connected in parallel, via conductors 528, with the electrical connections to the motor 506, so that the solenoid valve 494 will be closed whenever the motor 506 is operating. A coin blocking solenoid 530 and the contacts of the normally open pressure responsive switch 502 are connected in series across the power conductors 524, via conductors 532, 534 and 536. The usual selector switches 538 and 540 for cream and sugar control electromagnetic clutches 542 and 544 in the shafts for the valves 474 and 488.

In operation of the machine when a coin is deposited, the motor 540 turns one revolution to transfer measured quantities of coffee and cream into the two interlock chambers 468 and 470. After the transfer has been completed and the two metering valves 472 and 474 have almost returned to their initial filling position, the motor 506 starts to operate and, at the same time, the solenoid operated valve 494 is closed so that gas will no longer be admitted into the interlock chambers 468 and 470. At the same time, the time delay relay 520 closes its contacts and opens the vent valve 498 so that gas is vented from the two interlock chambers and the pressure therein returns substantially to atmospheric pressure just before the two valves 480 and 482 discharge the measured quantities of material from the interlock chambers into the mixing bowl 484. When the motor 506 stops upon opening the contacts of the cam operated switch 516, the solenoid operated valve 494 opens and re-admits gas under a slight pressure to the two interlock chambers 468 and 470. The time delay relay, however, delays opening its contacts so that the vent valve 498 will not close for an appreciable interval after gas has been re-admitted to the two interlock chambers. Thus, gas will displace the desired proportion of air remaining in the two interlock chambers 468 and 470 before the vent valve 498 closes. It also will be noted that since the contacts of the pressure responsive switch 502 are connected in series with the coin-blocking solenoid 530, no coin can be deposited as long as the pressure interlock chambers are below the gaseous pressure in the manifold 454. Hence, another coin cannot be deposited in the machine for another vending cycle until gas pressure has been re-established in the two interlock chambers. In this connection, the coin-blocking solenoid 530, and its function, can be eliminated in instances when gas concentration is desirably only a few percent.

In instances where gas concentration is desirably small with no air displacement, the vent valve 498 and the relay 520, together with their functions, can be eliminated, or only the delay function of the relay 520 eliminated.

Although both the coffee and cream containers 442 and 444 and their interlock chambers 468 and 470 have been shown as having the gas supply connection to the lowermost portions thereof for displacing air upwardly through vent valves at the highermost levels of the containers and the interlock chambers, this location of the gas supply connections and the vent valves will obtain only in the event that the preservative gas is heavier than air. Of course, if the preservative gas is lighter than air, the gas should be admitted to the top of the containers and to the top of the interlock chambers for displacement of heavier air at lowermost parts of the containers through lower located vent valves.

Dispensing of Powdered Materials—Preservative Gas Storage

The use of preservative gases to prevent deterioration of materials in machines embodying the principles of this invention for dispensing powdered materials is shown in FIGURE 11 of the drawings wherein a coin-operated vending machine for vending measured units of powdered materials is shown. The principles of mechanical operation of this machine are substantially identical to that shown in FIGURE 4 of the drawings, in that the machine has a storage container 546 provided with a solenoid-operated measuring receptacle 548 in the lower portion thereof, which receptacle is projectible through a lateral opening in the storage container into an interlock chamber 550 built on to the side of the storage chamber. The lower part of the interlock chamber 550 is formed by a sliding gate 552, in the same manner as is the interlock chamber 254 shown in FIGURE 4 of the drawings. A supply of gas under pressure is provided by a high pressure vessel 554 and a pressure regulator 556 leading to a manifold 558 the same as is shown in FIGURE 10 of the drawings and appropriate supply connections 560 and 562 from the manifold 558 lead to lower parts of the storage container 546 and to the interlock chamber 550, respectively, also, a normally open solenoid valve 564 is connected into the gas supply line 562 leading to the interlock chamber 550. Both the storage container 546 and the interlock chamber 550 are provided with pressure relief and manual vent valves 566 and 568 which may be the same as the valve 462 shown in FIGURE 10 of the drawings. The interlock chamber 550 is also provided with a solenoid-operated vent valve 570 which may be the same as the valve 498 shown in FIGURE 10.

The electrical controls for operating the receptable 548 and the gate 552 through a vending cycle initiated by a coin switch 572 are the same as those of the machine shown in FIGURE 4 and include the solenoids 574 and 576, limit switches 578 and 580, relays 582 and 584, and delayed closing time delay relay 586. The controls include another time delay relay 588, however, which is of the delayed opening type and has its energizing coil in series with a second set of normally open contacts of the relay 586 and this series connection is connected across the power conductors 590, via conductors 592, 594 and 596. A normally open set of contacts of the time delay relay 588 and the solenoid-operated vent valve 570 are connected in series across the power conductors, via conductors 600, 602 and 604.

It will thus be seen that the vent valve 570 is opened simultaneously with the closing of the solenoid valve 564 in the gas supply line 562 and with the opening of the gate 552 to discharge materials from the interlock chamber 550 into the usual mixing bowl 606. In this connection, it will be realized that additional time delay means (not shown) may be provided for the solenoid 576 to prevent opening of the gate 552 until a predetermined interval of time has elapsed to allow the pressure in the interlock chamber 550 to drop to normal, i.e. atmospheric pressure, to thus avoid projecting or blowing material out of the interlock chamber as the sliding gate opens.

It will also be seen that when the time delay relay 586 is de-energized to thus simultaneously close the solenoid valve 564 in the gas supply line and close the gate 552 in preparation for another vending cycle, the contacts of the time delay relay 588 will not open until an appreciable period of time thereafter, in order to permit the entering gas to displace the desired proportion of air in the interlock chamber 550 upwardly through the vent valve 570 before the latter closes. Thus, when the machine is reset for another vending cycle, substantially the same concentration of gas exists in the interlock chamber 550 as in the storage chamber 546, so that when the measuring receptacle 548 makes its excursion for a transfer of a unit of material from the storage chamber to the interlock chamber, the gaseous atmosphere in the storage chamber will remain of constant proportions.

A pressure responsive switch 608 is mounted on the interlock chamber 550, which switch has its contacts closed at atmospheric pressure but open when the pressure in the interlock chamber is up to the desired preservative gas pressure therein. The contacts of the pressure-responsive switch 608 and of a coin-blocking solenoid 610, which may be constructed and positioned the same as the solenoid 198, shown in FIGURE 1 of the drawings, are connected in series across the conductors 598, via conductors 612, 614 and 616.

Hence, after a unit of material has been discharged from the interlock chamber 550, another vending cycle cannot be initiated by a coin until the desired proportion of air has been displaced from the interlock chamber by the entering gas and the latter has built up to the desired pressure in the interlock chamber.

As in the previous embodiment, when no air is to be displaced by the gas but the air is only modified by the gas, the vent valve 570 and the time delay relay 588 together with their functions can be eliminated, or only the delay function of the relay 588 eliminated.

Dispensing of Articles—Preservative Gas Storage

The use of gas for the preservation of materials in a coin-operated vending machine of the type shown in FIGS. 6 to 9 of the drawings is illustrated in FIG. 12. The machine has a storage chamber 618 and an interlock chamber 620 therebelow, separated by a solenoid operated gate 622, exactly the same as the machine shown in FIGURE 9. The lower end of the interlock chamber 620 is closed by a pivoted gate 624 operated by a solenoid 626 and leading to a discharge chute 628, also exactly the same as the machine shown in FIGURE 9 of the drawings.

A gas supply line 630 from an appropriate source of supply of preservative gas, e.g. the manifold type of system shown in FIGURES 10 and 11, connects to the lower portion of the storage chamber 618, so that the storage chamber may be maintained filled with the desired proportions of air and a preservative gas at all times. Likewise, a gas supply line 632, having a normally open solenoid valve 634 therein, connects same gas supply system to the lower part of the interlock chamber 620.

Also connected to the interlock chamber 620 is a solenoid operated vent valve 636 and an adjustable pressure relief valve 638. An adjustable pressure relief valve (not shown) is also connected to the top of the storage chamber 618. The interlock chamber 620 also has a "drop-through" switch 640 mounted on a side wall thereof, which switch 640 may be identical to that shown in FIGURE 9 and adapted to be operated by spring-biased plate 642 when the latter is struck by an article falling into the interlock chamber.

The electrical circuits of the machine are substantially identical to those of the machine shown in FIGURE 9 of the drawings, save that the pressure-responsive switch 382 is replaced by a switch 644 which has contacts that are closed whenever the pressure in the interlock chamber 620 is below the standard gaseous storage pressure.

The electrical circuit, however, also includes another time delay relay 646 having two sets of normally open contacts. The relay 646 is set to delay opening its contacts for predetermined intervals of time after its energizing coil has been de-energized.

The time delay relay 646 has a third set of normally open contacts, which contacts and the energizing coil of the time delay relay 646 are connected in series across the power conductors 650 via conductors 652, 654 and 656. The solenoid operated vent valve 636 takes its power from the power conductors 658 via conductors 660, with the sets of normally open contacts of the relay 646 interposed in the latter.

The operation of this machine is substantially identical to that shown in FIGURE 9, i.e. the sequential operation of the machine, save that after a vending cycle has been substantially completed and a unit of material has been discharged from the interlock chamber 620 into the discharge chute 628, the vent valve 636 remains open for a predetermined interval of time after the solenoid valve 634 and, thus, the gas supply line 632 have been reopened and the gate 624 closed, so that the entering gas can displace the desired proportion of air from the interlock chamber 620 before the vent valve is closed. After this valve 636 closes, which will be after a predetermined interval after the de-energization of the relay 646, because of the time delay nature thereof, pressure will start to build up in the interlock chamber 620.

Meanwhile, the holding circuit for the relay 662 has not been reinterrupted because the contacts of the pressure-responsive switch 644 are closed. This switch 644 will open only when the pressure in the interlock chamber 620 again reaches predetermined normal gas storage pressure. Hence, when the holding circuit for the relay 622 is de-energized to again open the sliding gate 622 separating the storage chamber 618 from the interlock chamber 620, the pressure of the gas in the interlock chamber 620 will be normal.

As in the two previous embodiments, in instances where there is no air displacement but only modification thereof by gas, the vent valve 636 and the relay 646 together with their functions can be eliminated, or only the delay function of the relay 646 eliminated.

In all of the described embodiments of the invention, if the stored foods or beverages give off undesirable quantities of carbon dioxide, the latter may be absorbed by circulating the storage atmosphere through a suitable chemical.

It is obvious that the most appropriate preservation method, of the several disclosed, will be employed for any particular material. Hence, while cold gas storage might be best for one material in a dispensing machine, e.g. cream, cool vacuum storage might be best for another material in the same machine, e.g. coffee concentrate. Hence, the examples described are purely exemplary and the practical application of the principles of the invention is dependent on the particular material to be stored and dispensed.

Additionally, in vacuum storage and particularly in gas storage, it is advantageous to provide some means (not shown) to continuously or periodically agitate or stir stored bulk material for optimum results. This is particularly true of powdered materials and freshly thawed frozen liquids which are in almost a slush form.

It will thus be seen that the objects of this invention have been fully and effectively accomplished. It will be realized, however, that the several embodiments shown and described for the purposes of illustrating the principles of this invention are subject to change without departure from such principles. Accordingly, this invention includes all modifications encompassed in the spirit and scope of the following claims.

I claim:
1. In a machine for dispensing flowable perishable material, the combination comprising: a storage chamber for the material; an interlock chamber connected to said storage chamber and having a dispensing outlet; means for transferring a measured unit of material from said storage chamber to said interlock chamber and for sealing off the connection between said chambers; means for discharging the unit of material from said interlock chamber through said dispensing outlet and for sealing off the latter; means for at least partially displacing the air from each of said chambers to create a preservative atmosphere therein and for maintaining a predetermined pressure differential between each of said chambers and the atmosphere; means independent of said discharging means for equalizing the pressure in said interlock chamber with the atmosphere; and control means connected to said transferring and connection sealing-off means, discharge and outlet sealing-off means, and pressure equalization means for operating them in timed relation to effect a dispensing cycle in which a unit of material is transferred from said storage chamber to said interlock chamber and the connection therebetween is sealed off, said equalizing means equalizes the pressure in said interlock chamber with the atmosphere, said discharge and sealing-off means discharges the unit through said outlet and seals off the latter, said pressure-equalizing means is rendered inoperative, and said air displacing means again at least partially displaces the air from said interlock chamber in readiness for another dispensing cycle.

2. The structure defined in claim 1, in which the control means includes a coin-operated device for initiating a dispensing cycle.

3. The structure defined in claim 1, in which the machine is adapted to dispense a liquid, the interlock chamber is located below the storage chamber, the transfer and sealing-off means comprises a metering valve, and the discharge means comprises a valve means.

4. The structure defined in claim 1, in which the machine is adapted to dispense finely divided material, the storage chamber has a lateral outlet to the interlock chamber, and the transfer and sealing-off means includes an open bottom and open top receptacle slidably reciprocable on the bottom of said storage chamber for projection and retraction through said outlet.

5. The structure defined in claim 1, in which the air displacing means comprises means for at least partially filling said chambers with preservative gas under superatmospheric pressure.

6. The structure defined in claim 1, in which the air displacing means includes a source of preservative gas under pressure connected to said chambers and means for shutting off the connection between said gas source and said interlock chamber, and wherein the control means is connected to said shutting-off means and operates the latter during the discharge of the unit of material from said interlock chamber, and the control means automatically operates said equalizing means for a predetermined interval after resealing of said interlock chamber to at least partially redisplace air from the latter.

7. The structure defined in claim 1, including a coin-operated device associated with the transfer means, and controllable means for blocking the insertion of a coin into said device, and in which the control means is connected to said blocking means for rendering the latter operative unless the predetermined pressure differential exists in the interlock chamber.

8. The structure defined in claim 1, in which the air displacing means comprises vacuum maintaining means, and the control means includes means for shutting off communication between said vacuum means and the interlock chamber while the pressure equalizing means is operative.

9. In a machine for dispensing flowable perishable material, the combination comprising: a storage chamber for the material; an interlock chamber connected to said storage chamber and having a dispensing outlet; means for transferring a measured unit of material from said storage chamber to said interlock chamber and for sealing off the connection between said chambers; means for discharging the unit of material from said interlock chamber through said dispensing outlet and for sealing off the latter; means for establishing and maintaining a vacuum in each of said chambers to create a preservative atmosphere therein; means independent of said discharging means for relieving the vacuum in said interlock chamber; and control means connected to said transferring and connection sealing-off means, discharge and outlet sealing-off means, and vacuum relieving means for operating them in timed relation to effect a dispensing cycle in which a unit of material is transferred from said storage chamber to said interlock chamber and the connection therebetween is sealed off, said vacuum relieving means relieves the vacuum in said interlock chamber, said discharge and sealing-off means discharges the unit through said outlet and seals off the latter, said vacuum relieving means is rendered inoperative, and said vacuum establishing means again establishes a vacuum in said interlock chamber in readiness for another dispensing cycle.

10. In a machine for dispensing flowable perishable material, the combination comprising: a storage chamber for the material; an interlock chamber connected to said storage chamber and having a dispensing outlet; means for transferring a measured unit of material from said storage chamber to said interlock chamber and for sealing off the connection between said chambers; means for discharging the unit of material from said interlock chamber through said dispensing outlet and for sealing off the latter; means for at least partially displacing the air from each of said chambers to create a preservative atmosphere therein and for maintaining a predetermined pressure differential between each of said chambers and the atmosphere; means independent of said discharging means for equalizing the pressure in said interlock chamber with the atmosphere; and control means connected to said transferring and connection sealing-off means, discharge and outlet sealing-off means, pressure equalization means, and said displacing means for operating them in timed relation to effect a dispensing cycle in which a unit of material is transferred from said storage chamber to said interlock chamber and the connection therebetween is sealed off, said equalizing means equalizes the pressure in said interlock chamber with the atmosphere, said displacing means is rendered inoperative as respects said interlock chamber, said discharge and sealing-off means discharges the unit through said outlet and seals off the latter, said pressure-equalizing means is rendered inoperative, and said air displacing means is rendered operative as respects said interlock chamber and again at least partially displaces the air from said interlock chamber in readiness for another dispensing cycle.

11. A dispensing machine comprising: a storage chamber for material to be dispensed; an interlock chamber connected thereto for transfer of material therefrom into said interlock chamber, said interlock chamber having a normally sealed dispensing outlet; means for at least partially displacing the air from said chambers and maintaining a substantially equal pressure differential between each of said chambers and the atmosphere; and impulse initiated dispensing means for automatically transferring a unit of material from said storage chamber to said interlock chamber and sealing said connection therebetween, equalizing said interlock chamber pressure differential, discharging the unit of material from the interlock chamber through said outlet and resealing said outlet, and at least partially redisplacing the air from said interlock chamber preparatory to another dispensing cycle.

12. The structure defined in claim 11, in which the air displacing means includes vacuum pump means connected to said chambers, and the dispensing means includes means for shutting off the connection between the pump means and the interlock chamber after transfer of a unit of material to the latter and during discharge of the unit of material therefrom.

13. The structure defined in claim 11, in which the air displacing means includes a source of preservative gas under pressure connected to said chambers and the dispensing means includes means for venting said interlock chamber and for equalizing the pressure differential thereof, means for shutting off the connection between said gas source and said interlock chamber during discharge of the unit of material therefrom, and means for automatically operating said vent means for a predetermined interval after resealing of said interlock chamber to at least partially redisplace air from the latter.

14. The structure defined in claim 11, including a plurality of storage chambers and corresponding interlock chambers, and means for selectively rendering the dispensing means operative to dispense material from selected of said storage chambers.

15. A dispensing machine for liquids comprising: a storage chamber; an interlock chamber therebelow having a discharge outlet; metering valve means connecting said chambers; valve means controlling said discharge outlet; means for at least partially displacing air from said chambers and for maintaining a pressure differential between each of said chambers and the atmosphere; means for operating said metering valve means to transfer a unit of liquid from said storage chamber into said interlock chamber; means for equalizing said interlock chamber pressure differential; means for operating said discharge valve means to discharge the liquid unit from said interlock chamber; and means connected to said metering valve operating means, said discharge valve operating means, and said pressure equalizing means for operating them in timed relation.

16. The structure defined in claim 15, in which the air displacing means comprises vacuum maintaining means and means for shutting off communication between said vacuum means and the interlock chamber during operation of the pressure-equalizing means and the discharge valve operating means.

17. The structure defined in claim 15, in which the air displacing means includes means for supplying preservative gas under pressure to the chambers, means for shutting off said supply to the interlock chamber during operation of the discharge valve operating means, and means for operating the pressure-equalizing means for a predetermined interval after operation of the discharge valve operating means to displace a predetermined proportion of air from said interlock chamber.

18. A dispensing machine for finely divided materials comprising: a storage chamber; an interlock chamber adjacent to said storage chamber, the latter having a lateral outlet opening directly into said interlock chamber; measuring a receptacle means within said storage chamber and projectible through said outlet for transferring a unit of material from said storage chamber into interlock chamber; means for projecting and retracting said receptacle; means movable with said receptacle for sealing said outlet in the retracted position of said receptacle; normally closed gate means forming the bottom of said interlock chamber; means for operating said gate means to discharge material from said interlock chamber; means for at least partially displacing air from said chambers and for maintaining a pressure differential between each of said chambers and the atmosphere; means for equalizing said interlock chamber pressure differential; and means connected to said projecting means, said gate operating means, and said pressure equalizing means for operating them in timed relation.

19. The structure defined in claim 18, in which the air displacing means comprises vacuum maintaining means and means for shutting off communication between said vacuum means and the interlock chamber during the operation of the pressure-equalizing means and while the gate means is open.

20. The structure defined in claim 18, in which the air displacing means includes means for supplying preservative gas under pressure to the chambers, means for shutting off said supply to the interlock chamber while the gate means is open, and means for operating the pressure-equalizing means for a predetermined interval after the gate means closes to displace a predetermined proportion of air from said interlock chamber.

21. A dispensing machine comprising: a storage chamber for material to be dispensed; an interlock chamber connected thereto for transfer of material therefrom into said interlock chamber, said interlock chamber having a normally sealed dispensing outlet; means for modifying the air in said chambers with a preservative gas and for maintaining substantially equal pressure differentials between said chambers and the atmosphere; and impulse initiated means for automatically transferring a unit of material from said storage chamber to said interlock chamber and sealing said connection therebetween, equalizing said interlock chamber pressure differential, discharging the unit of material from said interlock chamber through said outlet and resealing said outlet, and remodifying the air in said interlock chamber by the preservative gas preparatory to another dispensing cycle.

References Cited in the file of this patent

UNITED STATES PATENTS

| | | |
|---|---|---|
| 849,462 | Cornish | Apr. 9, 1907 |
| 2,104,034 | Hamel | Jan. 4, 1938 |
| 2,110,518 | Becker | Mar. 8, 1938 |
| 2,138,356 | Ryan | Nov. 29, 1938 |
| 2,274,003 | Sheppard | Feb. 24, 1942 |
| 2,351,853 | Graham | June 20, 1944 |
| 2,462,019 | Bowman | Feb. 15, 1949 |
| 2,475,511 | Nicholson | July 5, 1949 |
| 2,546,879 | Wegman | Mar. 27, 1951 |
| 2,633,959 | Von Stoesser | Apr. 7, 1953 |
| 2,643,791 | Kollsman | June 30, 1953 |
| 2,857,083 | Masterson | Oct. 21, 1958 |
| 2,921,721 | Brooks | Jan. 19, 1960 |
| 2,949,993 | Adler | Aug. 23, 1960 |